United States Patent Office 2,998,396
Patented Aug. 29, 1961

2,998,396
PARTICULATE FOAMABLE STYRENE POLYMER TREATMENT PROCESS
Kenneth R. Nickolls, Wilbraham, Mass., assignor to Monsanto Chemical Company, St. Louis, Mo., a corporation of Delaware
No Drawing. Filed Mar. 21, 1958, Ser. No. 722,860
8 Claims. (Cl. 260—2.5)

The present invention relates to a process for treating particulate foamable styrene polymer compositions.

Styrene polymer foams constitute a valuable class of materials which are finding increasingly wide application in the fabrication of numerous industrial and consumer articles. A widely used method for fabricating such styrene polymer foams comprises extruding particulate foamable styrene polymer compositions through screw-type extruders. When styrene polymer foams are prepared by such extrusion processes it is difficult to obtain foams in which the cell sizes are uniform and of small diameter.

It is an object of this invention to provide particulate foamable styrene polymer compositions which when extruded, will provide foamed styrene polymers having cells of uniform small diameters.

Another object of this invention is to provide an improved process for extruding particulate foamable styrene polymer compositions.

Other objects and advantages of this invention will be apparent from the following detailed description thereof.

It has been discovered that particulate foamable styrene polymer particles can be extruded to obtain foamed resins having smaller and more uniform cell sizes if, prior to extrusion, the foamable styrene polymer particles are maintained under a gaseous pressure of at least 250 lbs. per square inch while maintaining the foamable styrene polymer particles below the second order transition temperature of the styrene polymer.

The following examples are set forth to illustrate more clearly the principle and practice of this invention to those skilled in the art. Unless otherwise specified, where quantities are mentioned they are parts by weight.

*Example I*

A lot of foamable polystyrene particles approximately 1 mm. in diameter and containing 7 weight percent pentane as a foaming agent is divided into 2 aliquots.

The first aliquot is extruded into a foamed sheet through a single screw extruder and sheet die at an extrusion temperature of about 315° F. The foam so obtained is brittle and the cell sizes thereof are both irregular and large with many of the cells having a diameter in excess of 0.05 inch.

The second aliquot of the foamable polystyrene particles is placed in an autoclave and maintained under a nitrogen pressure of about 1000 p.s.i. for 24 hours at 25° C. This material is removed from the autoclave and immediately extruded under the same conditions described in the paragraph above. The resulting foamed sheet is considerably more resilient than the previously prepared sheet and the cell sizes of the foam are more uniform and smaller in diameter.

*Examples II–V*

Example I is repeated except that the gas employed to pressurize the autoclave is, respectively, air, argon, methane and helium. In each case comparable results are obtained.

*Example VI*

Ninety-nine parts of foamable polystyrene particles having an average diameter of about 1 mm. and containing 7 weight percent pentane are intimately blended with 1 part of a finely divided amorphous silica having an average particle size of about 0.02 micron. The resulting composition is divided into 2 aliquots.

The first aliquot is extruded through a single screw extruder and sheet die at a temperature of about 315° F. The average cell size in the foamed sheet is about 0.012 inch.

The second aliquot is placed in an autoclave and maintained under a nitrogen pressure of about 1000 p.s.i. for 24 hours at 25° C. This material is removed from the autoclave and immediately extruded under the conditions specified in the paragraph above. The average cell size in the resulting foamed sheet is about 0.005 inch.

*Example VII*

Ninety-nine parts of the foamable polystyrene beads described in Example VI are maintained under a nitrogen pressure of 1000 p.s.i. for 24 hours and are then intimately blended with 1 part of the silica pigment described in Example VI. The resulting composition is extruded under the conditions specified in Example VI to obtain a foamed resin sheet in which the cells have an average diameter of about 0.005 inch.

The method of this invention consists of placing foamable styrene polymer particles under a gaseous pressure of at least 250 or preferably 1000 lbs. per square inch while maintaining the foamable styrene polymer particles below the second order transition temperature of the styrene polymer. The resulting foamable styrene polymer particles, when extruded, provide a foamed styrene polymer having smaller and more uniform cell sizes than is otherwise obtained. The magnitude of the effect obtained depends upon both the gas pressure applied and the period of time that the polymer particles are maintained under pressure. Preferably, the polymer particles are maintained under the gas pressure for a minimum period of 15 minutes and more especially for a period of an hour or more. Little or no additional benefit is obtained by maintaining the polymer particles under pressure for more than about 24 hours.

The gas employed in the process may be essentially any gas which does not dissolve the styrene particles under the conditions of temperature and pressure employed. Typical of the gases that have been successfully employed in the practice of the invention are nitrogen, air, oxygen, argon, helium, methane, ethane, carbon dioxide, etc. Throughout the treatment, the temperature of the foamable styrene polymer particles is maintained below the second order transition temperature of the styrene polymer and ordinarily is maintained at substantially room temperature. The gas and the pressure employed in the process are selected so that essentially none of the gas will condense to the liquid state.

The mechanism by which the high pressure inert gas modifies the foaming characteristics of the particulate foamable styrene polymers is not clear. Presumably, however, the phenomenon is physical in nature and may involve dissolution of the gas in the styrene polymer. This being the case, it is desirable to extrude the treated polymer particles immediately after treatment if the optimum reduction of pore size in the extruded foamed article is to be obtained.

A particularly important aspect of the invention is that the effect obtained in reducing the cell size when the foamable styrene polymer particles are extruded is additive with other known methods for achieving this effect. For example, the copending application of Frank A. Carlson, Jr., and Norbert Platzer, Serial No. 598,516, filed July 18, 1956, discloses that the pore size of an extruded foamed styrene polymer can be reduced by admixing a finely divided silica pigment with the foamable styrene polymer particles before they are extruded.

Example VI establishes that a still further reduction in the cell size can be achieved by further treating the foamable styrene polymer particles in accordance with the present invention.

The styrene polymers included in the compositions of this invention are homopolymers of styrene and interpolymers of styrene containing a predominant proportion of styrene, i.e., greater than 50 weight percent and preferably greater than 75 weight percent styrene. Examples of monomers that may be interpolymerized with the styrene included the conjugated 1,3-dienes, e.g., butadiene, isoprene, etc., alpha, beta unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of the styrene polymer with other polymers may be employed, e.g., blends of the styrene polymer with rubbery diene polymers, or the analogous compositions obtained by dissolving a rubbery diene polymer in the styrene monomer and subsequently polymerizing the mixture. In any of the above type resins, all or a portion of the styrene may be replaced with its closely related homologues such as alphamethylstyrene, o-, m-, and p-methylstyrenes, o-, m- and p-ethylstyrenes, 2,4-dimethylstyrene, etc. In general, the styrene polymers employed should have a molecular weight in the range of about 40,000–80,000 (as determined by the Staudinger method).

The foaming agents included in the compositions of the invention are aliphatic hydrocarbons boiling within the range of about 10° C. to about 80° C., e.g., pentane, hexane, heptane, cyclopentane, cyclopentadiene and petroleum ethers boiling within the indicated temperature range. If desired, mixtures of 2 or more such foaming agents may be employed. Usually 5–10 parts by weight of foaming agent are employed per 100 parts of styrene polymer.

The extrusion process provided by the present invention is conventional except for the composition employed therein. For example, the extrusion operation may be carried out in continuous screw extruders at temperatures ranging from about 250° F. to about 400° F., depending upon the softening temperature of the styrene polymer employed. The most uniform material is obtained by extruding at temperatures of 300–325° F. The material may be extruded through dies of any desired configuration into open or closed molds or into the open air. The pressure of the die should be greater than about 150 p.s.i. to prevent foaming within the die. The extrusion rates obtainable under any given set of extrusion conditions are fully equivalent to those obtained with corresponding untreated foamable styrene polymer compositions.

The above descriptions and particularly the examples are set forth by way of illustration only. Many other variations and modifications thereof will be apparent to those skilled in the art and can be made without departing from the spirit and scope of the invention herein described.

What is claimed is:

1. The method of improving the foaming characteristics of foamable styrene polymer particles which comprises maintaining foamable styrene polymer particles under a gas at a pressure of at least 250 lbs. per square inch for at least 15 minutes while maintaining the foamable styren polymer particles below the second order transition temperature of the styrene polymer; said foamable styrene polymer consisting of 100 parts by weight of a thermoplastic styrene polymer and about 5 to 10 parts by weight of an aliphatic hydrocarbon having a boiling point of about 10–80° C.; said gas being chemically inert with respect to the thermoplastic styrene polymer.

2. The method of claim 1 wherein the gas pressure is at least 1000 lbs. per square inch.

3. The method of claim 2 wherein the gas is nitrogen.

4. The method of claim 2 wherein the gas is air.

5. The method of claim 2 wherein the gas is helium.

6. The method of claim 2 wherein the gas is oxygen.

7. The method of claim 2 wherein the gas is methane.

8. In a process for extruding a particulate foamable styrene polymer composition having incorporated therein, as a foaming agent, an aliphatic hydrocarbon having a boiling point of about 10–80° C.; the improvement which comprises treating said foamable styrene polymer particles by the method of claim 1 before they are extruded.

References Cited in the file of this patent

UNITED STATES PATENTS

| | | |
|---|---|---|
| 2,576,977 | Stober | Dec. 4, 1951 |
| 2,744,291 | Stastny et al. | May 8, 1956 |
| 2,816,827 | Roth | Dec. 17, 1957 |
| 2,848,427 | Rubens | Aug. 19, 1958 |

FOREIGN PATENTS

| | | |
|---|---|---|
| 754,513 | Great Britain | Aug. 8, 1956 |